US009681778B2

(12) United States Patent
Pendleton et al.

(10) Patent No.: US 9,681,778 B2
(45) Date of Patent: Jun. 20, 2017

(54) FOOD PROCESSING TOOL

(71) Applicant: Kenwood Limited, Havant, Hampshire (GB)

(72) Inventors: Oliver Pendleton, Havant (GB); David Stephen Faram, Havant (GB); Nick Jays, Havant (GB)

(73) Assignee: KENWOOD LIMITED, Hampshire (GB)

( * ) Notice: Subject to any disclaimer, the term of this patent is extended or adjusted under 35 U.S.C. 154(b) by 403 days.

(21) Appl. No.: 14/371,600

(22) PCT Filed: Dec. 18, 2012

(86) PCT No.: PCT/GB2012/053169
§ 371 (c)(1),
(2) Date: Jul. 10, 2014

(87) PCT Pub. No.: WO2013/104883
PCT Pub. Date: Jul. 18, 2013

(65) Prior Publication Data
US 2015/0003190 A1 Jan. 1, 2015

(30) Foreign Application Priority Data

Jan. 10, 2012 (GB) .................. 1200299.4

(51) Int. Cl.
*A47J 43/07* (2006.01)
*B01F 7/00* (2006.01)
(Continued)

(52) U.S. Cl.
CPC ......... *A47J 43/0722* (2013.01); *A47J 43/046* (2013.01); *A47J 43/0711* (2013.01);
(Continued)

(58) Field of Classification Search
CPC ...... A47J 43/07; A47J 43/0722; A47J 43/046; A47J 43/1025; A47J 43/0711;
(Continued)

(56) References Cited

U.S. PATENT DOCUMENTS

| 1,612,281 A | 12/1926 | Goetz |
| 1,762,081 A | 6/1930 | Schleicher |
| 2011/0185917 A1 | 8/2011 | Goderiaux et al. |

FOREIGN PATENT DOCUMENTS

| DE | 10 2007 056711 | 5/2009 |
| EP | 0 292 664 | 11/1988 |

(Continued)

OTHER PUBLICATIONS

PCT/GB2012/053169 International Search Report dated Mar. 22, 2013 (2 pages).
(Continued)

*Primary Examiner* — Timothy Cleveland
(74) *Attorney, Agent, or Firm* — Brinks Gilson & Lione; G. Peter Nichols

(57) ABSTRACT

A tool intended as an attachment or accessory for a food processor and configured to automate the delicate operation of folding ingredients together without expelling air is described. The tool includes first and second curved blades which depend from a casing part that is rotated within a processing bowl by means of a geared arrangement that picks up rotary drive from a drive shaft coupled to a driven outlet on the base of the food processor. The blades are disposed at different distances from the axis about which the casing rotates, so that the outer blade passes closer to the wall of the bowl than does the inner blade.

11 Claims, 4 Drawing Sheets

(51) Int. Cl.
*B01F 7/30* (2006.01)
*A47J 43/10* (2006.01)
*A47J 43/046* (2006.01)

(52) U.S. Cl.
CPC ....... *A47J 43/1025* (2013.01); *B01F 7/00858* (2013.01); *B01F 7/00991* (2013.01); *B01F 7/305* (2013.01)

(58) Field of Classification Search
CPC .............. B01F 7/00116; B01F 7/00133; B01F 7/00191; B01F 7/00208; B01F 7/00275; B01F 7/00333; B01F 7/00375; B01F 7/00858; B01F 7/00991; B01F 7/162; B01F 7/166; B01F 7/1665; B01F 7/305
See application file for complete search history.

(56) References Cited

FOREIGN PATENT DOCUMENTS

| | | | |
|---|---|---|---|
| EP | 2 394 549 | 12/2011 | |
| FR | 2 954 181 | 6/2011 | |
| GB | 2 167 312 | 5/1986 | |
| IT | WO 2011134600 A1 * | 11/2011 | .......... B01F 7/00208 |

OTHER PUBLICATIONS

Search Report dated May 3, 2012 from corresponding Great Britain Appln. No. GB1200299.4 (1 page).

* cited by examiner

FOOD PROCESSING TOOL

This application claims priority to International Application No. PCT/GB2012/053169 filed Dec. 18, 2012; and Great Britain Patent Appln. GB 1200299.4 filed Jan. 10, 2012; the entire contents of each are incorporated herein by reference.

This invention relates to food processing, and it relates more especially to a tool attachable to an electrically driven food processor and usable for mixing ingredients in a bowl. The tool has particular application to the kind of processing that involves folding ingredients together without substantial expulsion of air from the mix.

Such processing is quite difficult to carry out manually, since the ingredients must be moved in a way that takes practice to perfect. Typically, a large spoon is used to gently lift and fold ingredients together. However, over folding or under folding can result in unsatisfactory results, either with the final product not rising fully and/or with the ingredients not being mixed together properly.

The present invention aims to simplify the folding process by providing a tool which, when used as an attachment to a food processor, enables automating and optimising the folding action so that users can reliably produce acceptable results, even if they are not experienced in the requisite manual techniques.

According to the invention there is provided a food processing tool comprising a casing part intended for bodily rotation about a drive axis and housing gear means adapted to pick up rotary drive from a food processor drive shaft disposed on said axis, the casing supporting first and second dependent blade members disposed at different distances from said axis and at different orientations there-around, wherein food-contacting surfaces of the blade members are each formed to gently lift and turn ingredients; the blade member further from said axis being configured to turn ingredients in towards the axis and the blade member closer to said axis being configured to turn ingredients outwardly therefrom.

By this means, the gentle folding action achieved by an experienced cook using spoons is simulated.

Preferably the gear means comprises first and second gear wheels configured as an epicyclic gearbox, since this configuration provides a rugged and reliable gearbox within a casing of usefully shallow dimensions.

Preferably the gear means causes the tool to rotate at a speed in the range from 15 to 60 rpm, since this permits ingredients to be folded without significant expulsion of air.

In preferred embodiments, the blade members are removable from the casing part to facilitate cleaning or replacement.

It is preferred that the blade members are each formed with a compound curvature and tilt to simulate manual folding of ingredients using a spoon.

In some preferred embodiments of the invention, the blade members remain fixed relative to said casing part when in operation, as this provides a robust and economic configuration of components.

In other embodiments of the invention, however, one or more of the blade members can be adapted to rotate relative to the casing part during operation, and such embodiments preferably comprise further driving means for causing at least one of said blade members to rotate about a second axis offset from that of the food processor shaft.

Preferably, in such embodiments, said second axis is disposed substantially parallel to the axis of said drive shaft.

In some preferred embodiments of the invention, said gear means comprises a first stationary sun gear, centered on said axis, and a planet gear having a first gear located and configured to pick up rotational drive from said drive shaft and a second gear arranged to mesh with and run around said sun gear. Moreover, it is then preferred that said further driving means comprises a second stationary sun gear disposed coaxially with the first, and a second planet gear centered on said second axis; the second planet gear being arranged to mesh with and run around the second sun gear as the casing part rotates bodily around the first-mentioned axis when driven by said drive shaft.

In some preferred embodiments of the invention, at least one of said blade members and/or a supportive shank thereof is flexible.

In any event, to utilise the invention, a user simply attaches the tool to a food processor, sets the operating speed of the food processor to the desired speed and runs the machine for a predetermined length of time.

In order that the invention may be clearly understood and readily carried into effect, embodiments thereof will now be described, by way of example only, with reference to the accompanying drawings of which:

Figure 4:
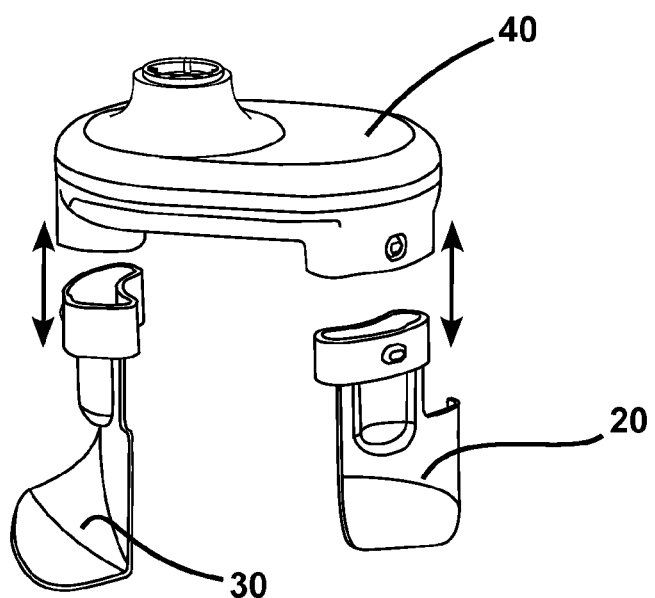
Figure 5:
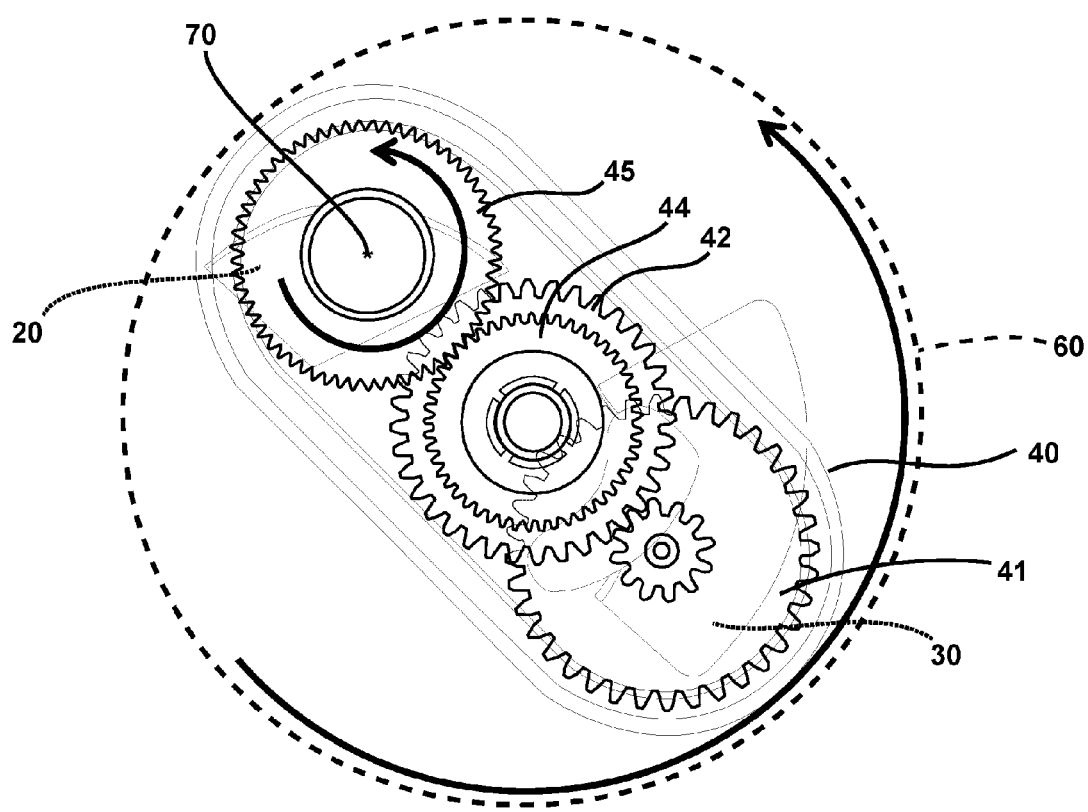
Figure 6:
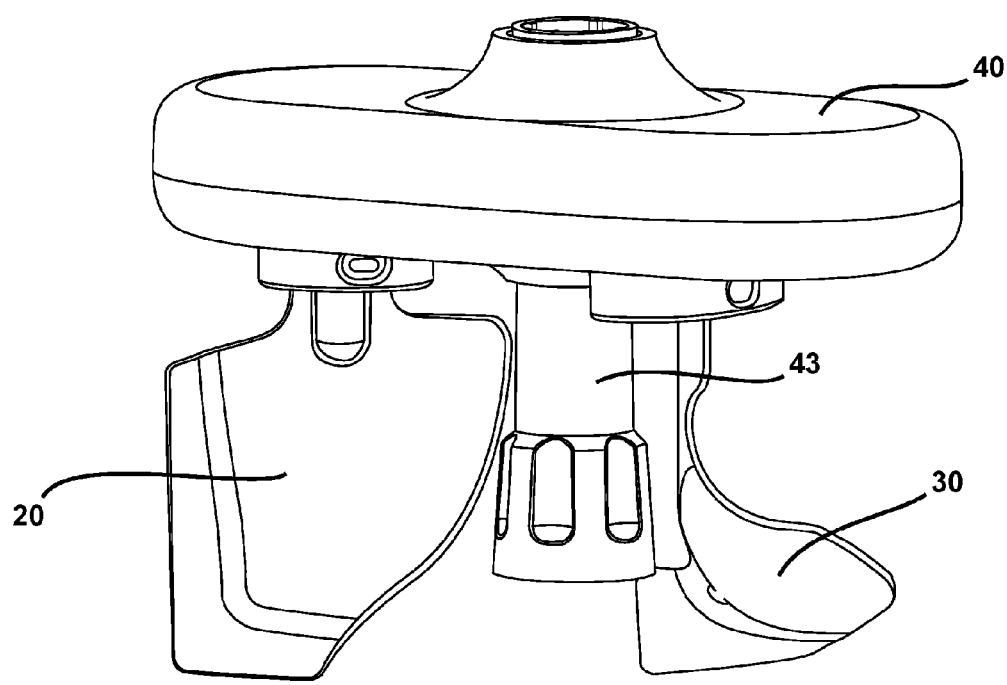

FIG. 4 indicates how the paddle-like blades may be removed from the tool for cleaning and storage; and FIGS. 5 and 6 are overhead and isometric views respectively of a tool in accordance with another example of this invention.

Referring now to FIGS. 1 through 4 of the drawings, the tool 10 in accordance with this embodiment of the invention comprises a pair of paddle-like blades 20 and 30 depending from a casing 40 which contains planet and sun gear wheels 41 and 42 respectively, arranged so as to pick up the drive from a drive shaft, disposed centrally of the bowl 60 of an electrically driven food processor. The lower part of the drive shaft is shown at 43 in FIGS. 1 to 3, and its upper part is shown at 50 in FIG. 3. The tool 10 is configured and disposed so as to slowly and bodily rotate around the shaft 43, 50.

As is well known, the drive shaft is driven in rotation from beneath the bowl 60 by means of an electric motor housed in a base casing (not shown) of the food processor, and appropriately geared. In this example, the drive shaft 43, 50 is fitted over, and driven by, an in-bowl drive system located in the base of the bowl and driven from an outlet of the food processor.

In some alternative embodiments, the drive shaft 43, 50 passes through an aperture in the base of the bowl 60 and runs in a central tube or chimney extending along the central axis of the bowl. It will be appreciated in this respect, however, that the precise manner in which the drive of the food processor is picked up and conveyed to the tool 10 is of little significance to the operation of the invention.

Returning to the present embodiment of the invention, the paddle-shaped blades 20 and 30 are formed, as shown in the drawings, with flat, open food-contacting surfaces which are gently curved and tilted towards their lower ends; the overall shape of each blade being intended to simulate the aforementioned manual folding movement when the casing 40 with its two dependent blades 20, 30 is bodily rotated at a slow speed about the axis of the drive shaft 50 by the interaction of the gears 41 and 42 with the shaft 43, 50. Gear 42 is, in this example, kept stationary, either by location to hard (fixed) points on the lid or by other means. In other embodiments, however, gear 42 may be driven, if a dual drive additional gearbox system is utilised.

As can be seen from the drawings, the blades 20 and 30 depend from opposite ends of the casing 40 and thus they are angularly offset as regards motion around the bowl. Indeed, in this example, the blades are offset by substantially 180 degrees in angle. Furthermore, the blades are disposed at different locations radially of the bowl 60. In this respect, blade 20, is disposed close to the upright wall of the bowl 60 and thus constitutes an outer blade; the tilt on its food-contacting surface being inwards towards the centre of the bowl. Blade 30, on the other hand, rotates closely around the centre of the bowl 60, and the tilt on its food-contacting surface is outwards, towards the side wall of the bowl 60.

The outer blade 20 is thus effective, in use, to lift ingredients in the bowl and roll them over towards the centre of the bowl 60, whereas the inner blade 30 is designed to lift ingredients and roll them over towards the outside wall of the bowl 60.

In this way, the tool 10 as a whole is designed to simulate the folding action required to fold ingredients together without knocking the air out; the profiles of the blade surfaces being designed to simulate the movement that would be achieved manually if using a spoon.

The planet and sun gears 41 and 42 and their interaction with the main drive shaft 43, 50 constitute an epicyclical gearbox, built into the casing 40 of the tool 10 which, in this example, is effective to reduce the rotational speed of the blades 20 and 30 down to 15 to 60 rpm, which is slow enough to fold the ingredients without knocking out the air.

The blades 20 and 30 do not, in this example, move relative to the casing 40 in operation, although one or both of them can be configured to do so if preferred, and one example of such an arrangement will be described later with reference to FIGS. 5 and 6. In any event, it is preferred that the blades 20 and 30 are removable from the casing 40 for cleaning and storage purposes, as shown in FIG. 4. In this respect, it will be appreciated that the blades 20 and 30 can be coupled to the casing 40 in any convenient way to permit ready removal and ready and secure re-attachment. Moreover, in this example, the fold tool 10 is configured to rotate bodily in an anti-clockwise direction within the bowl 60.

Figure 1:
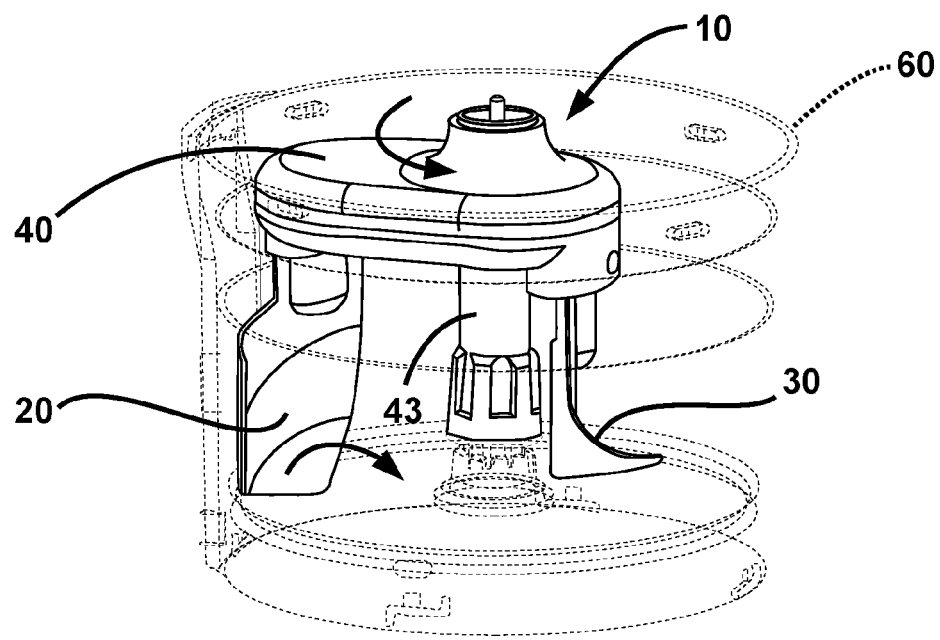
FIG. 1 shows a food processor bowl, in phantom outline, and a perspective view of a tool in accordance with one example of the invention, in a first orientation therein.
Figure 2:
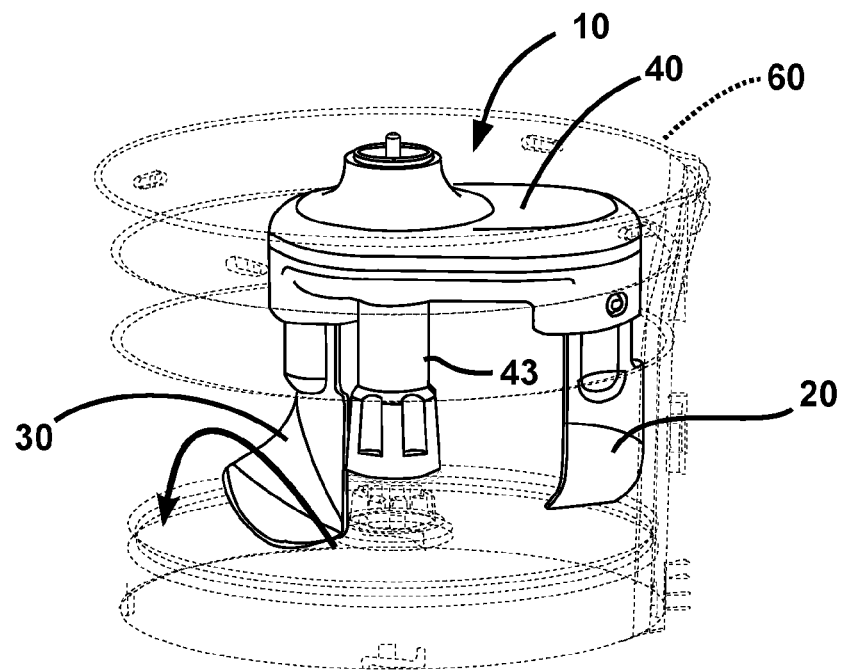
FIG. 2 is similar to FIG. 1, but shows the tool in a second orientation in the bowl.

The fold tool is shown in FIGS. 1 and 2 of the drawings as fitted into the processor bowl 60, but with the bowl lid removed.

In operation, the ingredients are moved around as the blades 20, 30 move within the bowl. The outer blade 20 scoops the ingredients up, rolls them over and deposits them towards the centre of the bowl 60. The inner blade 30, on the other hand, scoops the ingredients up, rolls them over and deposits them towards the outer part of the bowl 60.

As mentioned above, and as can be seen from the drawings, the fold tool 10 is rotated around the bowl via an epicyclic gearbox 41, 42 built into the casing 40. In operation, rotation of the drive shaft 43, 50 rotates planet gear 41, which is a compound gear. Sun gear 42 constitutes the final gear and is locked to the lid (not shown) of the bowl 60. As the compound gear 41 rotates, it runs around the outside of the final gear 42 which causes the fold tool 10 as a whole to rotate as described within the bowl 60, with blade 20 moving close to the upright wall of the bowl and blade 30 moving close to the centre of the bowl.

In the example of the present invention now to be described with additional reference to FIGS. 5 and 6, the outer blade 20 is arranged to rotate about a vertical axis 70 which is oriented parallel to that of the drive shaft 43, 50. It will be appreciated that, in other examples, the inner blade 30 could be caused to rotate instead of, or as well as, the outer blade 20.

Figure 3:
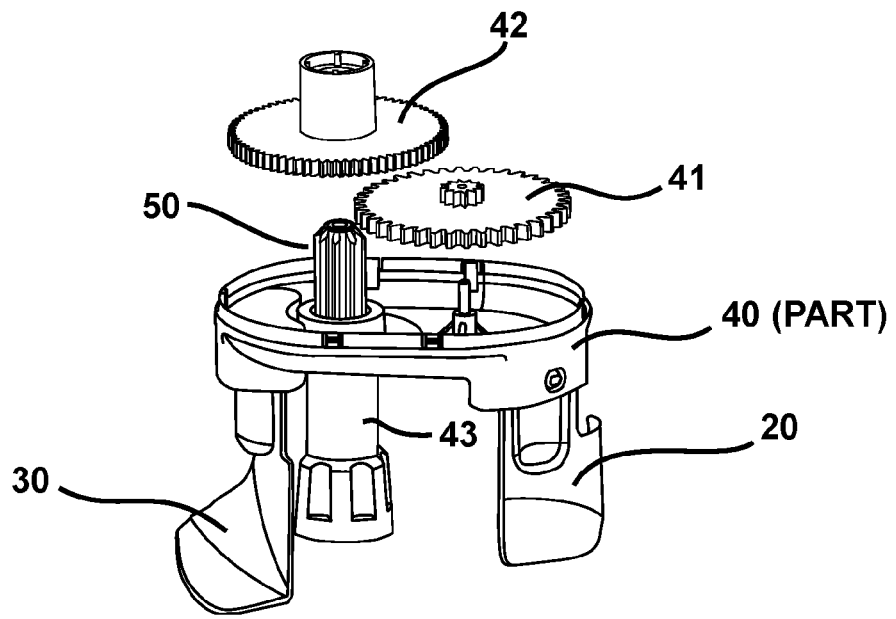
FIG. 3 shows the tool with the upper part of its casing removed to reveal the internal gearing in exploded view.

With particular reference now to FIGS. 5 and 6, the rotary movement of tool 20 about the axis 70 is conveniently achieved by modifying the gearing shown in FIG. 3 by providing the sun gear 42 with an upper, stationary gearwheel 44 coaxially with the stationary gearwheel 42, and arranging the gearwheel 44 to mesh with a mobile gearwheel 45 that is capable of turning the outer tool 20 about the axis 70 when the casing 40 is driven in rotation.

By this means, the compound gearwheel 41 meshes with driving splines on the shaft 43, 50 and causes the smaller gear on gearwheel 41 to run around the stationary gearwheel 42, as before. This causes bodily movement of the casing 40 about the axis of the central drive shaft 43, 50; carrying the tools 20 and 30 around with it.

In addition, in the arrangement of FIGS. 5 and 6, however, the stationary gearwheel 42 is also formed as a compound gear, carrying a smaller, upper gearwheel 44. A further gearwheel 45, located coaxially with the outer tool 20, is carried around by the casing 40 and is configured to run around the upper stationary gearwheel 44, thereby causing the outer tool 20 to rotate about the axis 70. It will be appreciated that alternative driving techniques could be used without departing from the scope of the invention and moreover, as already mentioned, that the inner tool 30 could be driven instead of or as well as the outer tool 20. It will also be appreciated that the gearing ratios will be selected to provide a desired bodily rotation rate for the casing 40 and a desired rotational rate of the tool 20 (and/or of the tool 30).

In any event, it is preferred that the blades 20 and 30 are removable from the casing 40 for cleaning and storage purposes, as previously described with reference to FIG. 4. In this respect, it will be appreciated that the blades 20 and 30 can be coupled to the casing 40 in any convenient way to permit ready removal and ready and secure re-attachment. The shape of the tools 20 and 30 will clearly vary with different food processor designs and in some embodiments of the invention, particularly where one or both of the tools are driven in rotation, the tools 20, 30 may be interchangeable to achieve different processing characteristics.

In this example of the invention, the fold tool 10 is configured to rotate bodily in an anti-clockwise direction within the bowl 60, and the outer tool 20 also rotates anti-clockwise about the axis 70. It will be appreciated, however, that other relationships between the rotational directions of the various components of the tool 10 can be used if preferred.

In operation, the ingredients are moved around as the blades 20, 30 move within the bowl. The outer blade 20 scoops the ingredients up, rolls them over and deposits them towards the centre of the bowl 60. The inner blade 30, on the other hand, scoops the ingredients up, rolls them over and deposits them towards the outer part of the bowl 60.

As mentioned above, and as can be seen from the drawings, the fold tool 10 is, in this example of the invention, rotated around the bowl and the blade 20 simultaneously rotated about its own axis, via an epicyclic gearbox 41, 42, 44, 45 built into the casing 40.

If desired, either or both of the blades 20 and 30 and/or their supporting shanks may be made somewhat flexible, or may be made of material that can flex in use. Alternatively or additionally, if desired, any edge or edges of the outer blade 20 that will, during operation, closely approach the inner wall of bowl 60 may be formed of flexible material, or may carry a flexible, wiper-like extension so as to ensure soft but consistent contact between the blade 20 and the said inner wall.

The invention claimed is:

1. A tool for processing foodstuff ingredients in a bowl of a food processor; the tool comprising a casing part mounted for bodily rotation about a drive-shaft axis disposed in operation centrally of the bowl, the casing part housing gears adapted to pick up rotary drive from a food processor drive shaft disposed on said drive-shaft axis and driven from beneath the bowl; and the casing part supporting first and second blade members depending therefrom into the bowl; said blade members being disposed at different distances from said drive-shaft axis and at different orientations therearound, and each formed with a compound curvature and tilt to simulate manual folding of ingredients using a spoon, thereby to gently lift and turn said ingredients; the first blade member being further from said drive-shaft axis and being configured with a food contacting surface tilted inwards to lift ingredients and turn them in towards the axis and the second blade member being closer to said drive-shaft axis and being configured with a food contacting surface tilted outwards to lift ingredients and turn them outwardly therefrom.

2. A tool according to claim 1, wherein said gears comprise first and second gear wheels configured as an epicyclic gearbox.

3. A tool according to claim 1, wherein said gears cause said tool to rotate at a speed in the range from 15 to 60 rpm.

4. A tool according to claim 1, wherein said blade members are removable from said casing part.

5. A tool according to claim 1, wherein said gears comprise a stationary sun gear, centered on said drive-shaft axis, and said gears further comprise a compound planet gear having a first gear located and configured to pick up rotational drive from said drive shaft and a second gear arranged to mesh with and run around said sun gear.

6. A tool according to claim 1, wherein, in operation, said blade members remain fixed relative to said casing part.

7. A tool according to claim 1, further comprising a drive mechanism to rotatably drive at least one of said blade members to rotate about a second axis offset from that of the food processor drive shaft.

8. A tool according to claim 7, wherein said second axis is disposed substantially parallel to the axis of said drive-shaft axis.

9. A tool according to claim 5, wherein said drive mechanism comprises a second stationary sun gear disposed coaxially with the first, and a second planet gear centered on a second axis; the second planet gear being arranged to mesh with and run around the second sun gear as the casing part rotates bodily around the drive-shaft axis when driven by said drive shaft.

10. A tool according to claim 1, wherein at least one of said blade members and/or a supportive shank thereof is flexible.

11. A tool according to claim 1, wherein an edge of at least one of said blade members is formed with or carries a wiper-like extension of flexible material.

* * * * *